US009567174B2

(12) United States Patent
Tsuyuki et al.

(10) Patent No.: US 9,567,174 B2
(45) Date of Patent: Feb. 14, 2017

(54) SHEET FEEDER

(71) Applicants: Yoichi Tsuyuki, Yamanashi-ken (JP); Yoshihiko Minagawa, Yamanashi-ken (JP); Koji Ueda, Yamanashi-ken (JP)

(72) Inventors: Yoichi Tsuyuki, Yamanashi-ken (JP); Yoshihiko Minagawa, Yamanashi-ken (JP); Koji Ueda, Yamanashi-ken (JP)

(73) Assignee: NISCA CORPORATION, Minamikoma-gun, Yamanashi-ken (JP)

( * ) Notice: Subject to any disclaimer, the term of this patent is extended or adjusted under 35 U.S.C. 154(b) by 0 days.

(21) Appl. No.: 14/714,950

(22) Filed: May 18, 2015

(65) Prior Publication Data
US 2015/0336759 A1    Nov. 26, 2015

(30) Foreign Application Priority Data

May 21, 2014 (JP) .................................. 2014-104962

(51) Int. Cl.
*B65H 7/18*    (2006.01)
*B65H 5/06*    (2006.01)
(Continued)

(52) U.S. Cl.
CPC ...... *B65H 7/18* (2013.01); *B65H 1/04* (2013.01); *B65H 1/08* (2013.01); *B65H 3/06* (2013.01); *B65H 3/0684* (2013.01); *B65H 5/06* (2013.01); *B65H 5/062* (2013.01); *B65H 7/02* (2013.01); *B65H 7/20* (2013.01); *H04N 1/00* (2013.01); *H04N 1/12* (2013.01); *B65H 2404/6111* (2013.01); *B65H 2511/10* (2013.01); *B65H 2511/20* (2013.01); *B65H 2511/51* (2013.01); *B65H 2511/515* (2013.01); *B65H 2511/528* (2013.01); *B65H 2513/512* (2013.01); *B65H 2513/514* (2013.01); *B65H 2513/53* (2013.01);
(Continued)

(58) Field of Classification Search
CPC ............... B65H 7/02; B65H 7/04; B65H 7/06; B65H 7/18; B65H 7/20; B65H 43/02; B65H 43/04
USPC ........................................................ 271/259
See application file for complete search history.

(56) References Cited

U.S. PATENT DOCUMENTS 4,763,160 A * 8/1988 Honjo ...................... B65H 7/14
271/227
5,131,648 A * 7/1992 Ito ............................ B65H 7/06
271/262
(Continued)

FOREIGN PATENT DOCUMENTS

JP    2005-244798 A    9/2005
JP    2008-280153 A    11/2008

*Primary Examiner* — Jeremy R Severson
(74) *Attorney, Agent, or Firm* — Manabu Kanesaka

(57) ABSTRACT

A sheet feeder includes a delivery roller that contacts a sheet on a sheet supply tray to deliver the sheet; a first detection sensor disposed upstream of the delivery roller so as to detect the sheet on the sheet supply tray; and a second detection sensor disposed downstream of the delivery roller so as to detect a leading end portion of the sheet on the sheet supply tray. The delivery roller is activated in a state where the first detection sensor detects the sheet on the sheet supply tray while the second detection sensor does not detect the leading end portion of the sheet on the sheet supply tray. Thus, all the actually feedable sheets placed on the sheet supply tray can be fed, thereby reducing a sheet setting failure on the sheet supply tray, which reduces trouble of performing a re-set operation.

9 Claims, 8 Drawing Sheets

(51) Int. Cl.
  *B65H 7/02*   (2006.01)
  *B65H 7/20*   (2006.01)
  *B65H 1/04*   (2006.01)
  *B65H 1/08*   (2006.01)
  *B65H 3/06*   (2006.01)
  *H04N 1/00*   (2006.01)
  *H04N 1/12*   (2006.01)

(52) U.S. Cl.
  CPC ....... *B65H 2553/82* (2013.01); *B65H 2801/39* (2013.01)

(56) References Cited

U.S. PATENT DOCUMENTS

| | | | | |
|---|---|---|---|---|
| 7,308,853 B2* | 12/2007 | Satoh | ............ | B65H 5/062 101/118 |
| 7,448,622 B2* | 11/2008 | Kim | ............ | B65H 5/34 271/228 |
| 7,460,825 B2* | 12/2008 | Sawanaka | ............ | G03G 15/607 271/111 |
| 7,469,895 B2* | 12/2008 | Aoki | ............ | B65H 7/02 271/265.02 |
| 8,145,077 B2* | 3/2012 | Miyauchi | ............ | G03G 15/55 271/259 |
| 8,382,093 B2* | 2/2013 | Dan | ............ | B65H 1/14 271/10.03 |
| 8,960,671 B2* | 2/2015 | Sugimoto | ............ | B65H 7/06 271/258.03 |
| 9,027,925 B2* | 5/2015 | Alaas | ............ | B65H 7/12 271/258.01 |
| 2010/0052249 A1* | 3/2010 | Tanaka | ............ | B65H 3/0684 271/265.01 |
| 2010/0187746 A1* | 7/2010 | Hirata | ............ | B65H 7/12 271/3.16 |
| 2010/0225045 A1* | 9/2010 | Kimura | ............ | B65H 3/0607 271/4.08 |
| 2012/0057212 A1* | 3/2012 | Tobinaga | ............ | B65H 3/0684 358/498 |
| 2013/0193640 A1* | 8/2013 | Kobayashi | ............ | H04N 1/0473 271/264 |

* cited by examiner

SHEET FEEDER

RELATED APPLICATIONS

The present application is based on, and claims priority from, Japanese Application No. JP2014-104962 filed May 21, 2014, the disclosure of which is hereby incorporated by reference herein in its entirety.

BACKGROUND OF THE INVENTION

Field of the Invention

The present invention relates to a sheet feeder that feeds a sheet set on a sheet supply tray to a processing section.

Description of the Related Art

An image forming device such as a copier or a scanner is provided with a sheet feeder for automatically feeding a sheet (document) onto a platen glass of an image reading section, which is called an ADF (Auto Document Feeder).

Conventionally, an ADF of this type is provided with a plurality of detection sensors for detecting a document position or a document set state. These detection sensors detect whether or not a document is present or whether or not a set document can be conveyed.

In the invention disclosed in Jpn. Pat. Appln. Laid-Open Publication No. 2005-244798, even if a document is set at a position where one of document set sensors does not detect the document, it is determined that the document is present when any one of the other sensors provided on the ADF indicates a detection state and thus conveyance of a subsequent document to the image reading section is restricted. In such a case, information for confirmation of the document set state is issued.

Further, in the invention disclosed in Jpn. Pat. Appln. Laid-Open Publication No. 2008-280153, the document set state is determined by means of a plurality of sensors provided on the ADF, and when a leading end of a document does not reach an aligning position at which the document can be fed and thus the document cannot actually be fed, an aligning means is used to align the document to the aligning position.

In a device as disclosed in above Jpn. Pat. Appln. Laid-Open Publication No. 2005-244798, there may be a case where it appears to an operator side that the document is properly set even though the set sensor does not detect the document on the sheet supply tray. Thus, there may be a case where sheet feed operation can actually be performed properly even though a setting failure is determined based on the sensor detection information. That is, there may be a case where the sensor information and actual state (i.e., whether or not the sheet feed operation can be performed) do not match each other.

In the invention disclosed in above Jpn. Pat. Appln. Laid-Open Publication No. 2008-280153, in a case where the leading end of the set document does not reach a sensor position at which it is determined that the document can be fed, an aligning means (aligning plate) is used to align the document leading end. Thus, trouble of issuing a re-set request or detecting the document set state once again can be avoided. However, providing such an aligning means requires a design change or increases production cost and a product size.

An object of the present invention is therefore to provide a sheet feeder capable of reducing occurrence of reprocessing and reoperation due to mismatch between the detection information from various detection sensors and an actual sheet set state.

SUMMARY OF THE INVENTION

A sheet feeder according to the present invention is a device that feeds a sheet placed on a sheet supply tray toward a predetermined processing position. The sheet feeder includes: a delivery roller that contacts the sheet on the sheet supply tray to deliver the sheet; a first detection sensor disposed upstream of the delivery roller so as to detect the sheet on the sheet supply tray; a second detection sensor disposed downstream of the delivery roller so as to detect a leading end portion of the sheet on the sheet supply tray; and a controller that activates the delivery roller in a state where the first detection sensor detects the sheet on the sheet supply tray while the second detection sensor does not detect the leading end portion of the sheet on the sheet supply tray.

According to the sheet feeder of the present invention, the delivery roller is activated even in a state where the first detection sensor disposed upstream of the delivery roller detects the sheet while the second detection sensor disposed downstream of the delivery roller does not detect the sheet. With this configuration, it is possible to prevent determination that the sheet setting failure has occurred in spite of a state that the sheets can be actually fed, thereby avoiding trouble of issuing an alarm indicating occurrence of the setting failure and performing re-set of the sheet according to the alarm.

DESCRIPTION OF THE PREFERRED EMBODIMENTS

Figure 1:
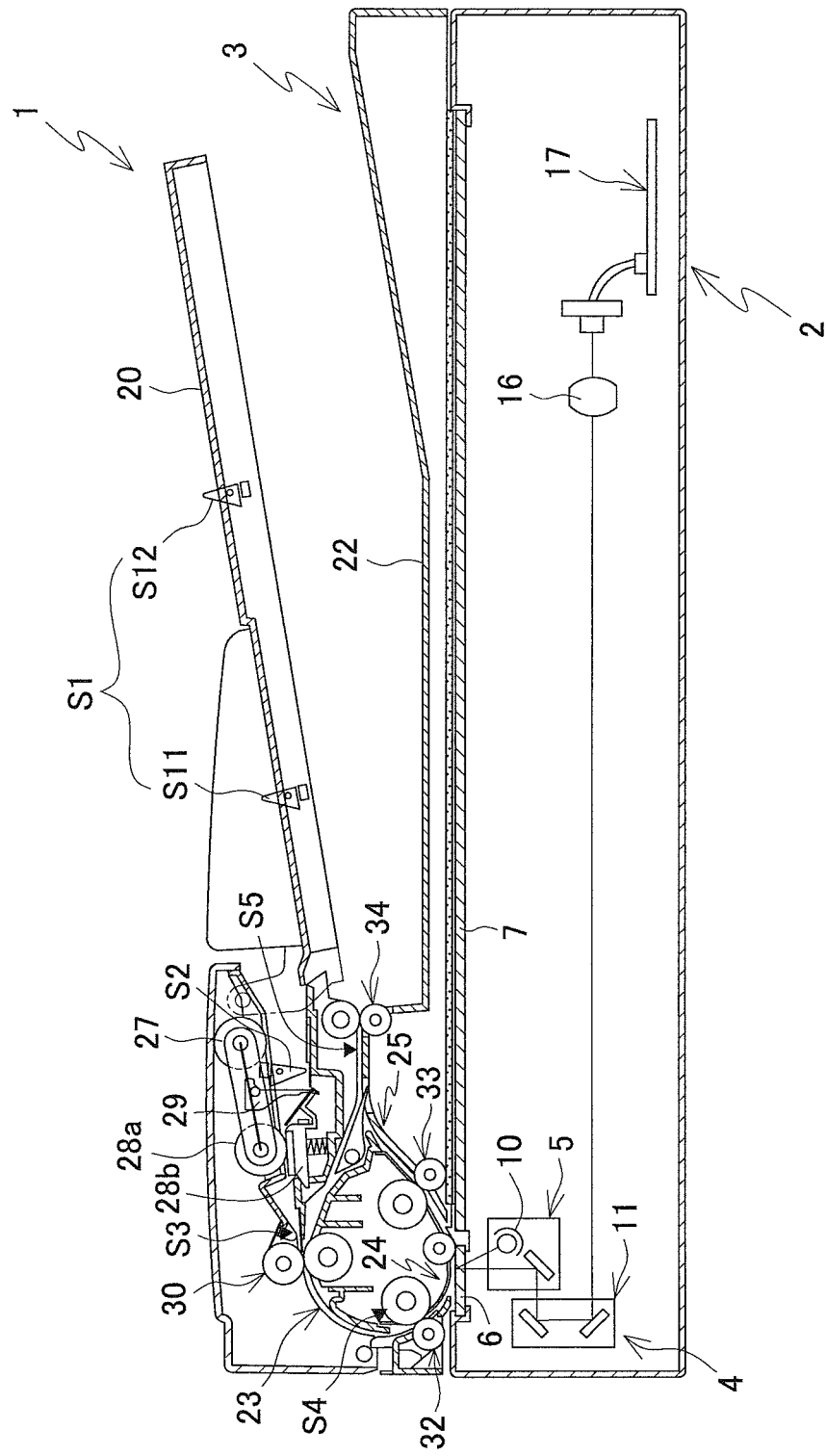
FIG. 1 is a cross-sectional view of a sheet feeder according to the present invention.

An embodiment of a sheet feeder according to the present invention will be described in detail below. FIG. 1 illustrates an example of a sheet feeder. A sheet feeder 1 has a main body unit 2 having an image reading section 4 and a conveying unit (ADF) 3 mounted on top of the main body unit 2 so as to be openable/closable.

The image reading section 4 reads a sheet (document) passing through an upper surface of a first contact glass 6 with an optical section 5 in a fixed state. A second contact glass 7 having a planar space for placing a document thereon is provided on an upper surface of the main body unit 2, and the image reading section 4 reads a document set on the contact glass 7 while moving the optical section 5 of the image reading section 4.

The image reading section 4 has a light source 10 such as a lamp, a plurality of mirrors 11, a lens 16, a photoelectric conversion element 17 such as a CCD, and the like. Light emitted from the light source 10 is irradiated onto a conveyed or placed document through the first contact glass 6 or the second contact glass 7. The light irradiated onto a surface of the document and reflected thereon is reflected several times by a plurality of mirrors 11, followed by photoelectric conversion using the photoelectric conversion element 17 via the lens 16, whereby an image of the document is read.

The following describes a configuration of the ADF 3. As illustrated in FIG. 1, the ADF 3 has a sheet supply tray on which a plurality of documents can be placed and a sheet discharge tray 22 that houses documents that have been subjected to reading processing.

The ADF 3 is further provided with a document feed means including a sheet feed path 23 along which the plurality of documents stacked on the sheet supply tray 20 are fed one by one, a read path 24 extending from the sheet feed path 23 and passing through the first contact glass 6, and a sheet discharge path 25 extending from the read path 24 to the sheet discharge tray 22.

There are provided, downstream of the sheet supply tray 20, a delivery roller 27 brought into contact with a document to deliver the document, a feed roller 28*a* feeding the delivered document, a separating member 28*b* brought into pressure contact with the feed roller 28*a* to separate documents, and a resist roller 30 against which a leading end of a document abuts for alignment and which then feeds the document toward the first contact glass 6.

There are provided, along the read path 24, a first read roller 32 disposed at an upstream side of the first contact glass 6 and a second read roller 33 disposed at a downstream side thereof. Further, there is provided, at a downstream side of the sheet discharge path 25, a discharge roller 34 that discharges a document to the sheet discharge tray 22.

Further, there is provided, at a downstream end of the sheet supply tray 20, a stopper 29 against which a leading end of a document to be set on the sheet supply tray 20 abuts for regulation. A user sets the document on the sheet supply tray 20 with the leading end thereof abutting against the stopper 29, whereby the document can be set at an appropriate position on the sheet supply tray 20.

As illustrated in FIG. 1, various detection sensors are provided at positions through which a document passes. More specifically, a first detection sensor (size sensor) S1 that detects a document size is disposed on the sheet supply tray 20 at a position upstream of the delivery roller 27, and a second detection sensor (set sensor) S2 that detects a leading end portion of a document set on the sheet supply tray 20 is disposed downstream of the delivery roller 27. The set sensor S2 is provided in front of the stopper 29 so as to be able to detect whether a document set on the sheet supply tray 20 is at an adequate position regulated by the stopper 29. The size sensor S1 and the set sensor S2 serve as a trigger for performing document feeding processing.

Further, a third detection sensor (resist sensor) S3 is disposed near the resist roller 30. The resist sensor S3 determines whether or not a document can be conveyed toward the image reading section 4. When it is determined that the document can be conveyed, the document is nipped by the resist roller 30; on the other hand, when it is determined that the document cannot be conveyed, un-feed processing is performed.

Further, a fourth detection sensor (read sensor) S4 is disposed downstream of the resist sensor S3, and a fifth detection sensor (sheet discharge sensor) S5 is disposed on a conveying path downstream of the fourth detection sensor S4.

It is hereinafter assumed that a state where each of the above-described sensors detects a document is "ON" and that a state where each of the above-described sensors does not detect a document is "OFF".

The size sensor S1 includes a small-size sensor S11 that detects a small-sized document and a large-size sensor S12 that detects a large-sized document. When only the small-size sensor S11 indicates "ON", a size of the document is determined to be small; when both the small-size sensor S11 and the large-size sensor S12 indicate "ON", the document size is determined to be large.

The set sensor S2 detects whether or not the leading end portion of a document is located at an adequate position where the document can be delivered by operation of the delivery roller 27. When the set sensor S2 indicates "ON", sheet feed processing is performed regardless of a detection result of the size sensor S1.

The resist sensor S3 detects whether or not a document delivered by the delivery roller 27 and fed by the feed roller 28*a* is located at a position where it can be nipped by the resist roller 30. When the resist sensor S3 indicates "ON", the document is conveyed toward the image reading section 4; on the other hand, when the "OFF" state continues for a predetermined time, it is determined that a jamming occurs, and the un-feed processing is performed.

In the present embodiment, the small-size sensor S11 and the large-size sensor S12 constituting the size sensor S1 and the set sensor S2 are lever-type sensors, and the resist sensor S3, the read sensor S4, and the sheet discharge sensor S5 are reflection-type sensors. The lever-type sensor and the reflection-type sensor are each a commonly used type. The lever-type sensor is provided with a lever that is swung by a document passing therethrough and detects presence/absence of the document from a swinging state or an inclination thereof. The reflection-type sensor detects presence/absence of a document depending on whether or not light is reflected by the document.

Figure 2:
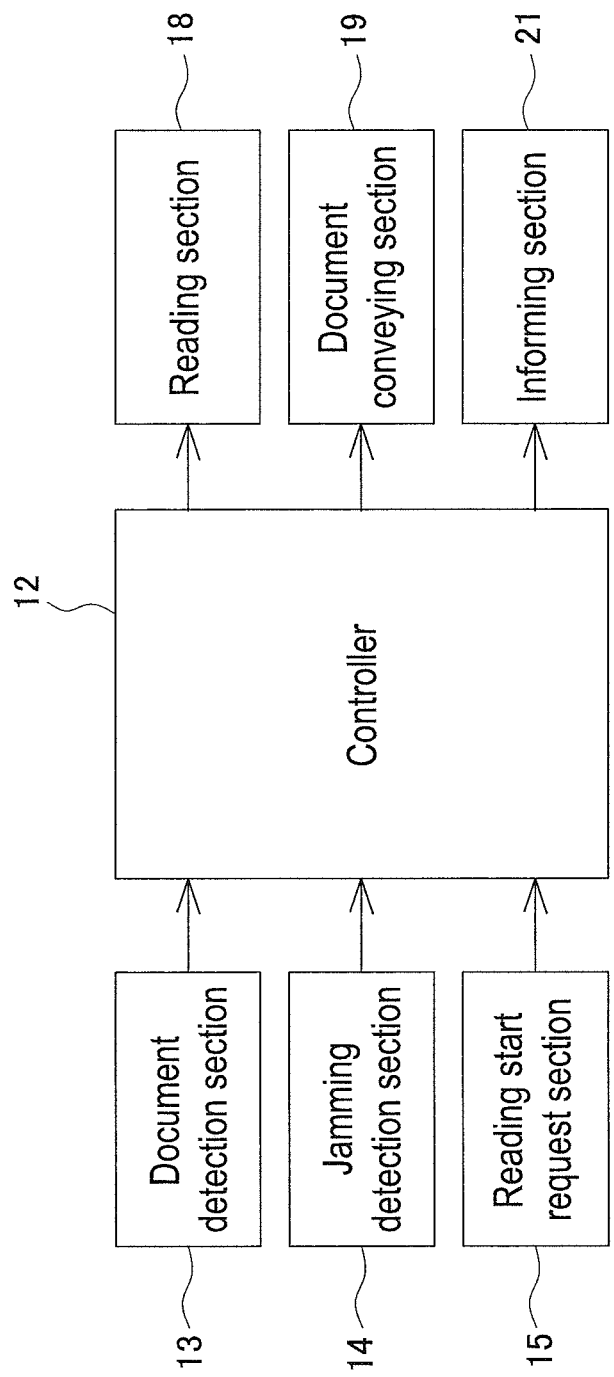
FIG. 2 is a block diagram illustrating a configuration of the sheet feeder.

As illustrated in FIG. 2, the sheet feeder according to the present invention includes a controller 12 that controls the entire sheet feed operation, a document detection section 13 that transfers control information to the controller 12, a jamming detection section 14, a reading start request section 15, a reading section 18 that operates in the controller 12, a document conveying section 19, and an informing section 21.

The document detection section 13 detects, based on detection results of the size sensor S1 and the set sensor S2, whether or not a document can be fed. The jamming detection section 14 detects, based on detection results of the resist sensor S3, the read sensor S4, and the sheet discharge sensor S5, whether or not a conveyance failure (jamming) has occurred. The reading start request section 15 issues a document reading start request to the controller 12 depending on determination results of the document detection section 13 and the jamming detection section 14. Upon receiving the document reading start request from the reading start request section 15, the controller 12 activates the delivery roller 27 and the feeding roller 28*a* to start feeding of a document on the sheet supply tray 20 to the image reading section 4 for image reading.

The controller 12 further controls, based on detection results of the document detection section 13 and the jamming detection section 14, operations of the reading section 18 and the document conveying section 19. More specifically, the controller 12 controls operations (rotation and stop) of the first and second read rollers 32 and 33 provided in the reading section 18 and controls operations (rotation and stop) of the delivery roller 27, the feed roller 28a, and the resist roller 30 provided in the document conveying section 19. Further, the informing section 21 informs, when it is determined based on the detection results of the document detection section 13 and the jamming detection section 14 that malfunction has occurred, a user of information or alarm display by using a display panel.

Figure 3A:
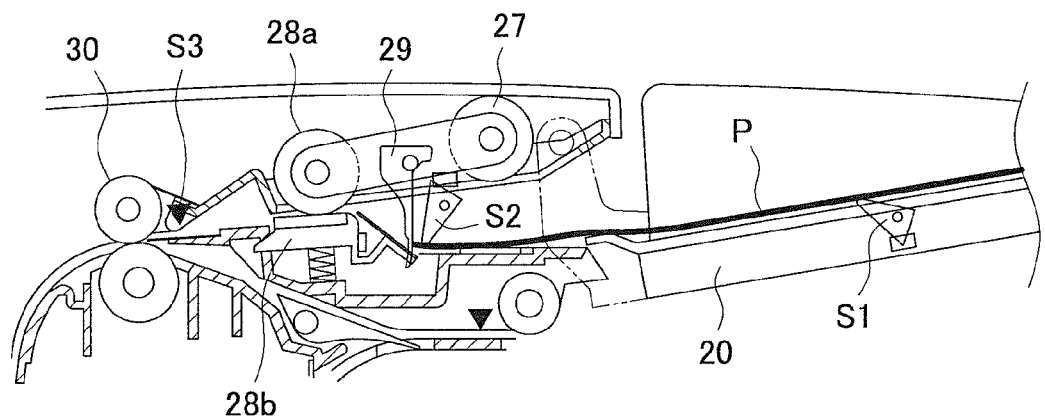
FIGS. 3A and 3B are first explanation views illustrating a sheet feed pattern.
Figure 3B:
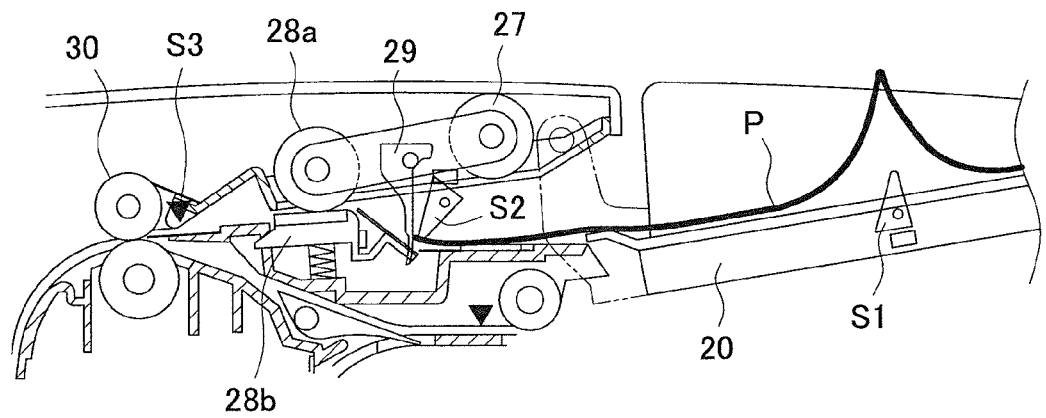

The following describes operation performed based on the detection results of the sensors in the document detection section 13 with reference to FIGS. 3A, 3B and FIGS. 4A, 4B. As illustrated in FIGS. 3A and 3B, when the set sensor S2 indicates "ON", the reading start request section 15 issues the reading request of a document P regardless of the detection result of the size sensor S1. The size sensor S1 indicates "ON" when any one of the small-size sensor S11 and the large-size sensor S12 indicates "ON" and indicates "OFF" when both the small-size sensor S11 and the large-size sensor S12 indicate "OFF". Hereinafter, the small-size sensor S11 and the large-size sensor S12 are collectively referred to as the size sensor S1. In FIG. 3B, the document P is bent around the size sensor S1, so that the size sensor S1 indicates "OFF" (document P is not detected). Thus, when a part of the document P is lifted at a detection position of the size sensor S1 due to curl or crease of the document P as illustrated in FIG. 3B, the document P is not detected.

Figure 4A:
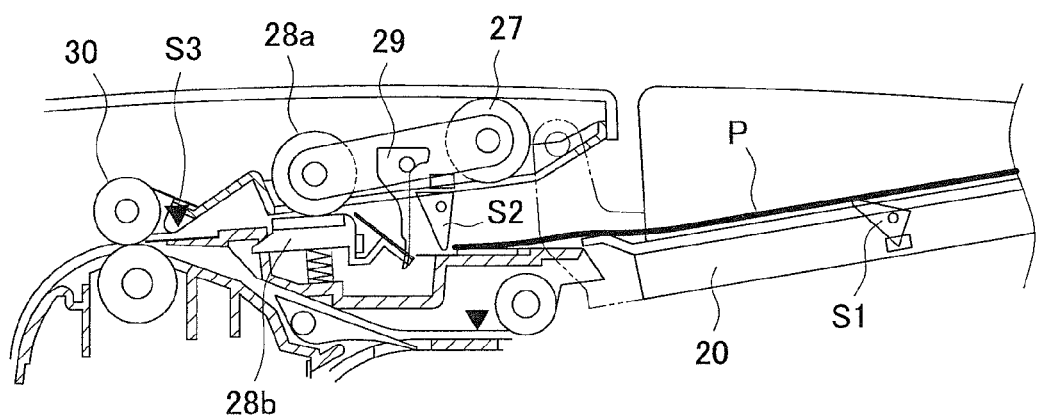
FIGS. 4A and 4B are second explanation views illustrating the sheet feed pattern.
Figure 4B:
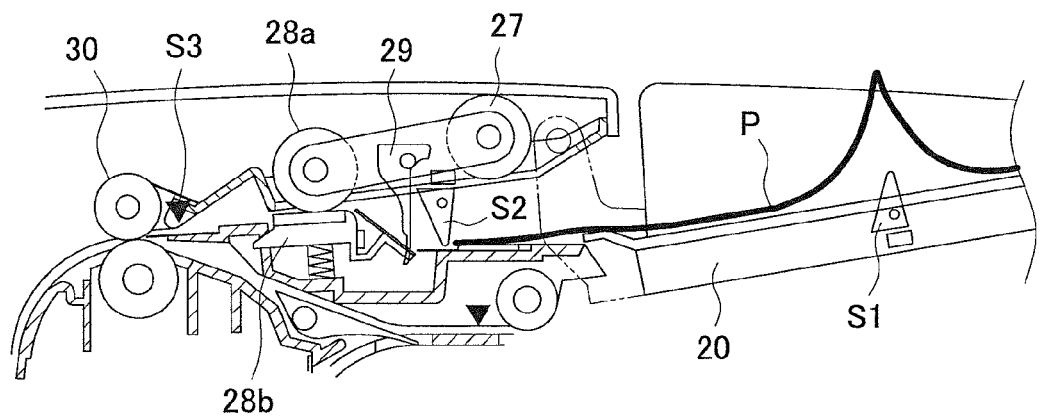

In a state illustrated in FIG. 4A, a leading end of the document P does not reach the set sensor S2, so that the set sensor S2 cannot be turned "ON" (i.e., the set sensor S2 stays in the "OFF" state), while the size sensor S1 indicates "ON". In such a case, although the set sensor S2 does not detect the document P, feed operation of the document P may be performed. Thus, when the size sensor indicates "ON", the reading start request is issued, and the sheet feed operation is started. In a state illustrated in FIG. 4B, the leading end of the document P does not reach the set sensor S2, and both the size sensor S1 and the set sensor S2 indicate "OFF", so that the sheet feed operation is not performed.

Figure 5A:
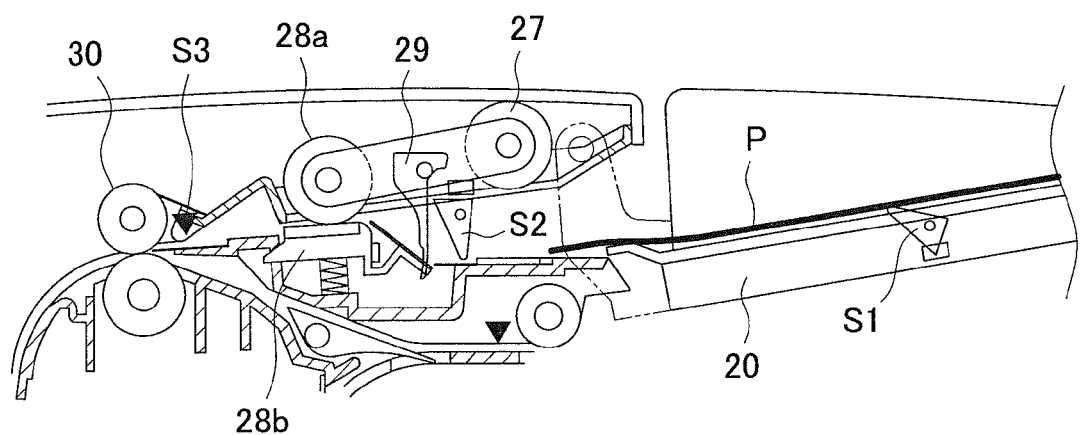
FIGS. 5A and 5B are third explanation views illustrating the sheet feed pattern.
Figure 5B:
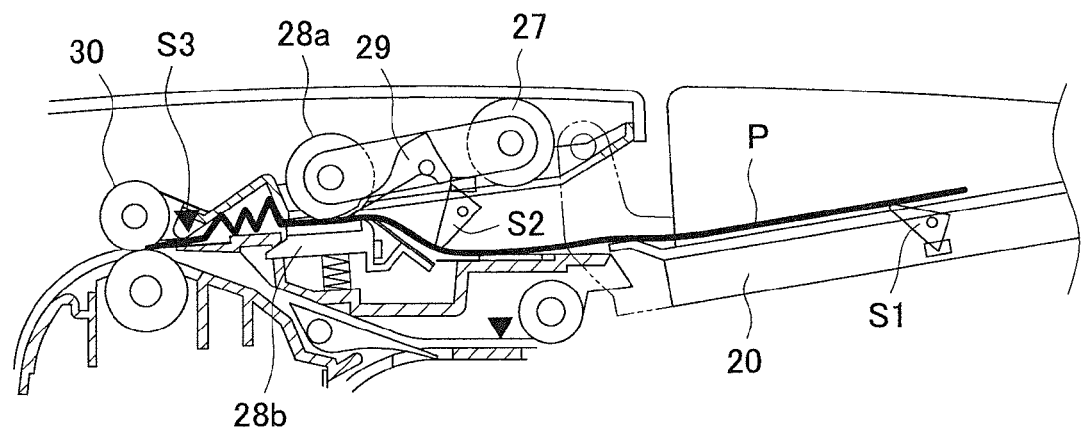

FIGS. 5A and 5B each illustrate operation when a jamming occurs after start of the sheet feed operation. Operations of FIGS. 5A and 5B are executed in a case where the document P does not reach a position where it can be fed. In a state illustrated in FIG. 5A, the sheet feed operation is started since the size sensor indicates "ON"; however, the leading end of the document P does not reach the set sensor S2. In such a case, when the document P is located at a position where it cannot be delivered by the delivery roller 27, the document P cannot be fed. Thus, in such a state, the jamming detection section 14 determines that the document P is not properly set, and the informing section 21 issues an alarm indicating that the document P is not properly set and a re-set request. This processing is executed when the document P is not detected by the resist sensor S3 although the sheet feed operation has been started. In a state illustrated in FIG. 5B, both the size sensor S1 and the set sensor S2 indicate "ON", so that the reading request is issued, and the sheet feed operation is started based on the reading request, but a jamming has occurred immediately before the resist sensor S3. Thus, it is determined that the document P is jammed between the set sensor S2 and the resist sensor S3. In such a case, the sheet feed operation is stopped, and an alarm indicating occurrence of the jamming is issued by the informing section 21.

Figure 6:
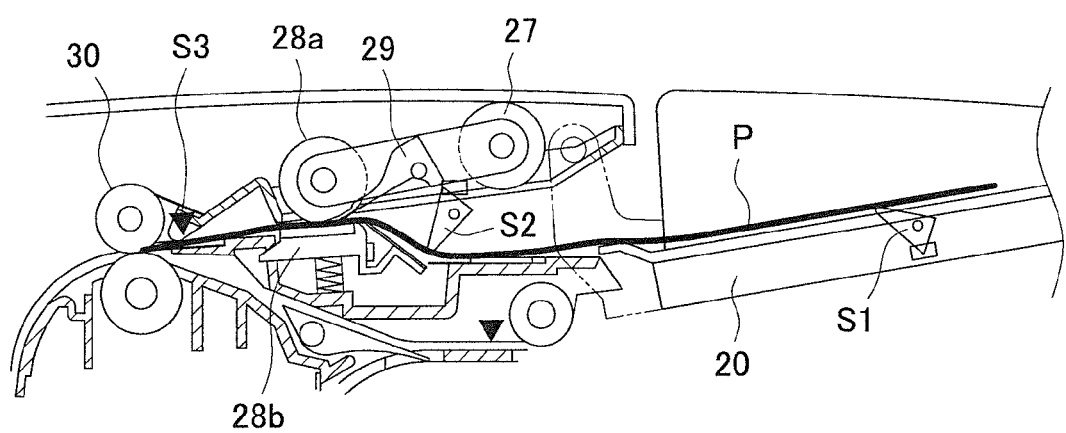
FIG. 6 is a fourth explanation view illustrating the sheet feed pattern.

In a state illustrated in FIG. 6, the size sensor S1, the set sensor S2, and the resist sensor S3 all indicate "ON". In this state, the document P can be normally conveyed toward the image reading section 4 by the document conveying section 19.

Figure 7:
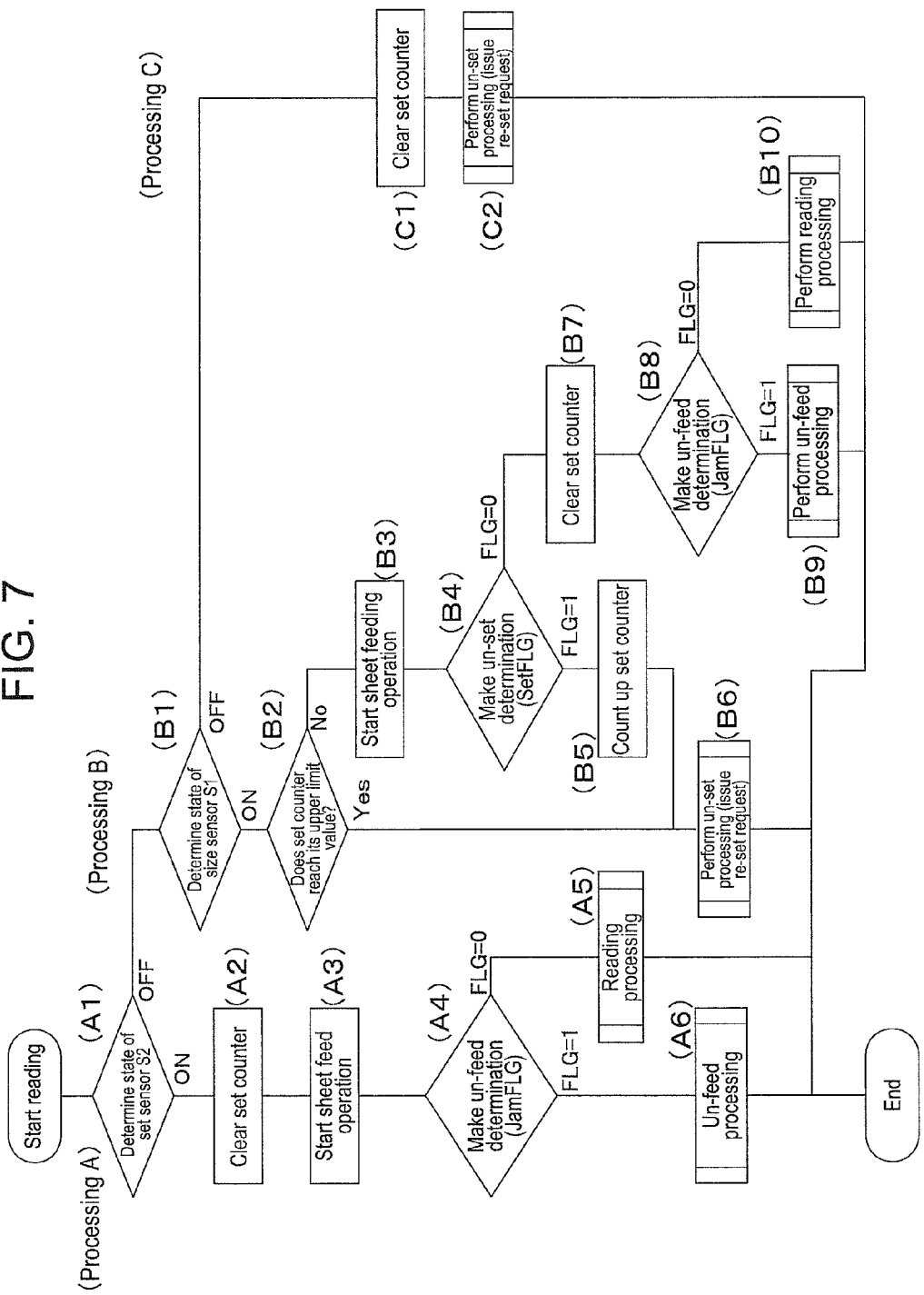
FIG. 7 is a control flowchart for starting sheet feed operation.
Figures 8A, 8B:
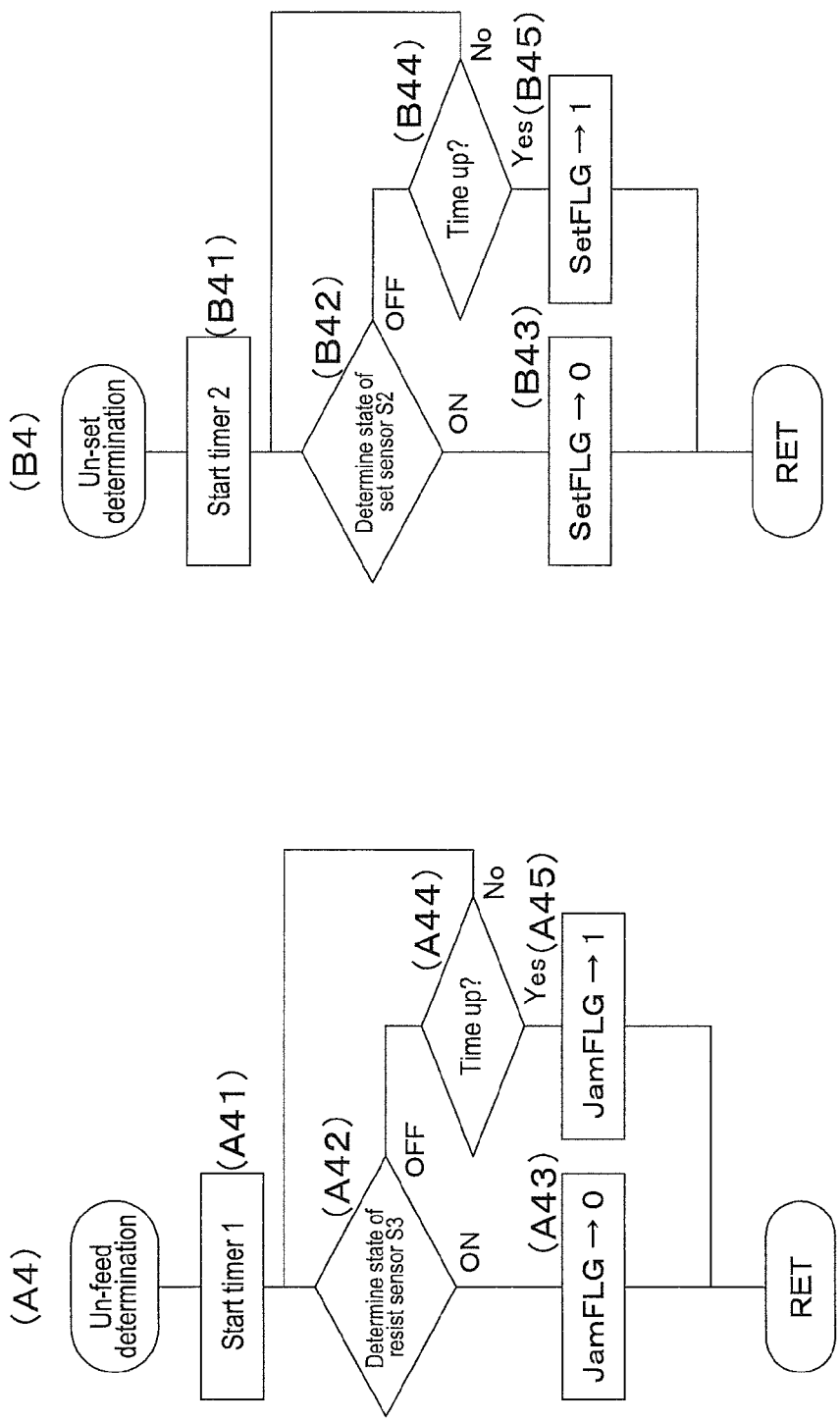
FIGS. 8A and 8B are detailed flowcharts of un-feed determination and un-set determination, respectively.

FIG. 7 and FIGS. 8A and 8B are each a flowchart of sheet feed control. FIG. 7 is the entire control flow, and FIGS. 8A and 8B illustrate details of processing flows in an un-feed determination (A4, B8) and un-set determination (B4) in FIG. 7, respectively. In this processing flow, processing A, processing B, and processing C are executed depending on the detection results of the size sensor S1, the set sensor S2, and the resist sensor S3. A set counter in the flowchart of FIG. 7 is a counter that counts the number of times that the document is detected by the set sensor S2 and can be arbitrarily set. The set counter is used for setting a waiting time for accurately confirming a set state of the document.

The processing A is a flow to be executed when the set sensor S2 indicates "ON" (the detection result of the size sensor S1 is ignorable). A reading start is performed in a state where the document P is set on the sheet supply tray 20, and a state of the set sensor S2 is detected first (A1). When the set sensor S2 indicates "ON" at this time, the set counter is cleared (A2), and then immediately the sheet feed operation is started (A3). Then, un-feed determination (A4) is made for the document P started to be fed. In this un-feed determination (A4), when the resist sensor S3 detects the document until a predetermined time t1 elapses from the start of the sheet feed operation (A3), an un-feed flag (JamFLG) indicates "0", and the flow shifts to reading processing (A5) of FIG. 7. On the other hand, when the resist sensor S3 does not detect the document until the predetermined time t1 elapses from the start of the sheet feed operation (A3), the un-feed flag JamFLG is set to "1", and the flow shifts to un-feed processing (A6) of FIG. 7.

The un-feed processing (A4) will be described below more in detail. As illustrated in FIG. 8A, a timer T1 is used to count the predetermined time. The predetermined time t1 is set to a time which is several time as long as a time taken to convey the document from the stopper 29 to the detection position of the resist sensor S3.

Then, the timer T1 is started from a time point of the start of the sheet feed operation (A3). When the resist sensor S3 indicates "ON" (detects the document) until the timer T1 reaches the predetermined time t1, the un-feed flag (JamFLG) indicates "0" (A43). On the other hand, when the resist sensor S3 indicates "OFF" (not detect the document) even when the timer T1 reaches the predetermined time t1, time is up, and the un-feed flag (JamFLG) indicates "1".

In the reading processing (A5), the document P is conveyed toward the first contact glass 6 and then discharged toward the sheet discharge tray 22 after being read (see FIG. 1). On the other hand, in the un-feed processing (A6), it is determined that a jamming of the document P has occurred between the sheet supply tray 20 and the resist sensor S3, and the informing section 21 instructs, through display, a user to remove the jammed document P. Further, at this time, after confirmation that both the size sensor S1 and the set sensor S2 indicate "OFF", the un-feed processing (A6) is released.

The processing B is a flow to be executed when the set sensor S2 indicates "OFF" while the size sensor S1 indicates "ON" (B1). First, it is checked whether or not the set counter (B2) reaches a set upper limit value. Then, when the upper limit value is reached, it is determined that the document setting failure has occurred. Then the delivery roller 27 is stopped, and the flow shifts to an un-set processing (B6) where an alarm indicating the setting failure and re-set request are issued. That is, when the document setting failure successively occurs, the sheet feed operation is not started unless the document is set at a position at which the set sensor indicates "ON".

When the set counter (B2) does not reach the upper limit value, the sheet feed operation is started (B3). Then, an un-set determination (B4) is made for the document P started to be fed. In this un-set determination (B4), when the set sensor S2 detects the document until a predetermined time t2 elapses from the start of the sheet feed operation (B3), an un-set flag (SetFLG) is set to "0"; on the other hand, when the set sensor S2 does not detect the document until the predetermined time t2 elapses, the un-set flag (SetFLG) is set to "1".

More in detail, as illustrated in FIG. 8B, a timer T2 is used to count the predetermined time. First, the timer T2 is started after start of the sheet feed operation (B41). The predetermined time t2 is set to a time which is several time as long as a time taken to convey the document from the delivery roller 27 to the detection position of the set sensor S2.

Then, when the set sensor S2 indicates "ON" (detects the document) until the timer T2 reaches the predetermined time t2, the un-set flag (SetFLG) indicates "0" (B43). On the other hand, when the set sensor S2 indicates "OFF" (not detect the document) even when the timer T2 reaches the predetermined time t2, time is up, and the un-set flag (SetFLG) is set to "1" (B54).

Thereafter, when the un-set flag (SetFLG) indicates "0" in the un-set determination (B4), the flow returns to the processing B of FIG. 7, where the set counter is cleared (B7), followed by an un-feed determination (B8) same as that performed in the processing A.

In the un-feed determination (B8), the timer T1 is started from a time point when the set sensor is turned "ON" (B42). Then, when the resist sensor S3 detects the document until the timer T1 reaches the predetermined time t1, the un-feed flag (JamFLG) indicates "0" (A43). On the other hand, when the resist sensor S3 does not detect the document even when the timer T1 reaches the predetermined time t1, time is up, and the un-feed flag (JamFLG) indicates "1".

Then, when the un-feed flag (JamFLG) indicates "0" in the processing of the un-feed determination (B8), reading processing (B10) is executed; when the un-feed flag (JamFLG) indicates "1", un-feed processing (B9) is executed.

When the un-set flag (SetFLG) indicates "1" in the un-set determination (B4), the set counter is counted up (B5) as illustrated in FIG. 7, and the flow shifts to the un-set processing (B6). In the un-set processing (B6), based on the determination that the document setting failure has occurred, the delivery roller 27 is stopped, and an alarm indicating the setting failure and re-set request are issued.

The un-feeding processing (B9) and reading processing (B10) in the processing B are the same as the un-feeding processing (A6) and the reading processing (A5) in the processing A, respectively, so descriptions thereof will be omitted.

According to the above-described processing B, even though the set sensor S2 indicates "OFF", the sheet feed operation is executed when the size sensor S1 detects a document on the sheet supply tray 20. Thereafter, when the set sensor S2 is turned "ON", the sheet feed operation is continued; on the other hand, when the set sensor S2 is not turned "ON", it is determined that the document setting failure has occurred. Thus, the re-set request is issued to the user only when the sheet feed operation can not actually be performed, thereby significantly reducing trouble caused due to the document setting failure.

The processing C is a flow to be executed when both the set sensor S2 and the size sensor S1 indicate "OFF". In this case, the set counter (C1) is cleared, immediately followed by un-set processing (C2), and this routine is ended.

In the un-set determination (B4) of the processing B of FIG. 7, there may be a case where, within the predetermined time t2, the resist sensor S3 indicates "ON" although the set sensor S2 indicates "OFF". This may occur because the document P is fed to the resist sensor S3 even though the set sensor S2 does not detect the document P for some reason. In such a case, the flow may shift directly to the reading processing (B10).

Further, in the un-set determination (B4) of the processing B, when, within the predetermined time t2, the size sensor S1 changes from "ON" to "OFF" in a state where the set sensor S2 indicates "OFF", it may be determined that the document on the sheet supply tray 20 is moved. In this case, the set counter may be cleared (B7), and the flow may shift to the un-feed determination (B8).

In the above-described embodiment, a sheet feeder used in the ADF that automatically feeds a sheet (document) onto a platen glass of an image reading section is exemplified as the sheet feeder of the present invention; however, the present invention is not limited to this but may be applied to various types of the sheet feeder, such as a sheet feeder mounted in an image forming device or a printer.

What is claimed is:

1. A sheet feeder for feeding a sheet toward a predetermined processing position, comprising:
    a sheet supply tray for placing the sheet;
    a delivery roller adapted to contact the sheet on the sheet supply tray to deliver the sheet;
    a first detection sensor disposed upstream of the delivery roller and adapted to detect the sheet while the sheet is placed on the sheet supply tray;
    a second detection sensor disposed downstream of the delivery roller and adapted to detect a leading end portion of the sheet while the sheet is placed on the sheet supply tray;
    a stopper disposed adjacent to the sheet supply tray and adapted to abut against the leading end portion of the sheet to regulate the leading end portion of the sheet while the sheet is placed on the sheet supply tray before the delivery roller is actuated; and
    a controller activating the delivery roller in a state where the first detection sensor detects the sheet and the second detection sensor does not detect the leading end portion of the sheet while the sheet is placed on the sheet supply tray,
    wherein the second detection sensor detects the leading end portion of the sheet while the leading end portion of the sheet is located adjacent to the stopper,
    the first detection sensor is a size sensor adapted to detect a size of the sheet while the sheet is placed on the sheet supply tray,
    the second detection sensor is a set sensor adapted to detect the leading end portion of the sheet while the sheet placed is on the sheet supply tray,
    the first detection sensor includes a small-size sensor adapted to detect a sheet having a predetermined size and a large-size sensor adapted to detect a sheet having a size larger than the predetermined size, the first detection sensor is structured so that when only the small-size sensor detects the sheet, the size of the sheet is determined to be the predetermined size, and when the small-size sensor and the large-size sensor detect the sheet, the size of the document is determined to be larger than the predetermined size, and when the second detection sensor detects the leading end portion of the sheet and the first detection sensor does not detect the sheet while the sheet is placed on the sheet supply tray, the controller controls the delivery roller to contact and deliver the sheet toward the predetermined processing position.

2. The sheet feeder according to claim 1, wherein when the second detection sensor does not detect the sheet within a predetermined time from a time point when the delivery roller is activated in the state where the first detection sensor detects the sheet and the second detection sensor does not detect the sheet while the sheet is placed on the sheet supply tray, the controller stops the delivery roller.

3. The sheet feeder according to claim 1, wherein when the second detection sensor does not detect the sheet within a predetermined time from a time point when the delivery roller is activated in the state where the first detection sensor detects the sheet and the second detection sensor does not detect the sheet while the sheet is placed on the sheet supply tray, the controller controls an informing section to report information indicating that the sheet is not set on the sheet supply tray.

4. The sheet feeder according to claim 1, further comprising:

a feed roller adapted to feed the sheet delivered by the delivery roller toward the processing position; and a third detection sensor adapted to detect the sheet to be fed to the processing position, wherein when the sheet is not detected by the third detection sensor within a predetermined time from a time point when the second detection sensor detects the sheet, the controller stops the delivery roller and the feed roller.

5. The sheet feeder according to claim 4, wherein when the sheet is not detected by the third detection sensor within the predetermined time from the time point when the second detection sensor detects the sheet, information indicating that a sheet conveying failure has occurred is reported.

6. The sheet feeder according to claim 1, wherein when the first and second detection sensors detect the sheet while the sheet is placed on the sheet supply tray, the controller controls the delivery roller to contact and deliver the sheet toward the predetermined processing position.

7. The sheet feeder according to claim 6, wherein when the first detection sensor detects the sheet, the second detection sensor does not detect the sheet, and the delivery roller does not contact the sheet within a predetermined time after the controller controls the delivery roller to contact the sheet, the controller stops the delivery roller and informs that malfunction has occurred.

8. The sheet feeder according to claim 7, wherein when the first detection sensor detects the sheet, the second detection sensor does not detect the sheet, and the delivery roller contacts the sheet within the predetermined time after the controller controls the delivery roller to contact the sheet, the delivery roller delivers the sheet toward the predetermined processing position.

9. The sheet feeder according to claim 8, further comprising:

a feed roller adapted to feed the sheet delivered by the delivery roller toward the processing position; and a third detection sensor adapted to detect the sheet to be fed to the processing position, wherein when the sheet is not detected by the third detection sensor within a predetermined time from a time point when the second detection sensor detects the sheet, the controller stops the delivery roller and the feed roller.

* * * * *